United States Patent
Choi et al.

(10) Patent No.: US 8,353,613 B2
(45) Date of Patent: Jan. 15, 2013

(54) LIGHT GUIDE PLATE AND DISPLAY APPARATUS COMPRISING THE SAME

(75) Inventors: Byoung-Iyong Choi, Seoul (KR); Hong-seok Lee, Seongnam-si (KR); Jong-min Kim, Suwon-si (KR); Eun-kyung Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 416 days.

(21) Appl. No.: 12/687,290

(22) Filed: Jan. 14, 2010

(65) Prior Publication Data

US 2010/0208493 A1 Aug. 19, 2010

(30) Foreign Application Priority Data

Feb. 18, 2009 (KR) .................. 10-2009-0013506

(51) Int. Cl.
*F21V 7/04* (2006.01)
*H01L 33/00* (2010.01)

(52) U.S. Cl. ........ 362/607; 362/601; 362/602; 362/606; 362/615

(58) Field of Classification Search ............ 362/84, 362/601, 602, 615, 606, 607
See application file for complete search history.

(56) References Cited

U.S. PATENT DOCUMENTS

| | | | |
|---|---|---|---|
| 6,744,960 B2 * | 6/2004 | Pelka | 385/130 |
| 7,018,060 B2 | 3/2006 | Choi et al. | |
| 7,188,989 B2 * | 3/2007 | Miyashita | 362/621 |
| 7,686,493 B2 * | 3/2010 | Roshan et al. | 362/607 |
| 2006/0103589 A1 * | 5/2006 | Chua et al. | 345/3.1 |
| 2007/0263408 A1 * | 11/2007 | Chua | 362/612 |
| 2009/0034292 A1 * | 2/2009 | Pokrovskiy et al. | 362/617 |
| 2012/0113672 A1 * | 5/2012 | Dubrow et al. | 362/602 |

FOREIGN PATENT DOCUMENTS

| | | |
|---|---|---|
| JP | 2003-338212 A | 11/2003 |
| JP | 2004-207610 A | 7/2004 |
| KR | 1020040090667 A | 10/2004 |
| KR | 1020040103285 A | 12/2004 |
| KR | 1020070014861 A | 2/2007 |
| KR | 1020080018728 A | 2/2008 |

* cited by examiner

*Primary Examiner* — Stephen F Husar
*Assistant Examiner* — James Cranson, Jr.
(74) *Attorney, Agent, or Firm* — Cantor Colburn LLP

(57) ABSTRACT

A light guide plate includes a plurality of quantum dots on at least one of a surface of the light guide plate and inside the light guide plate, wherein the plurality of quantum dots emit light having a different wavelength than a light incident thereto.

16 Claims, 2 Drawing Sheets

LIGHT GUIDE PLATE AND DISPLAY APPARATUS COMPRISING THE SAME

CROSS-REFERENCE TO RELATED APPLICATION

This application claims priority to Korean Patent Application No. 10-2009-0013506, filed on Feb. 18, 2009, and all the benefits accruing therefrom under 35 U.S.C. §119, the content of which in its entirety is herein incorporated by reference.

BACKGROUND

1. Field

One or more embodiments of the present invention relate to a light guide plate ("LGP") that emits white light using quantum dots and a display apparatus including the same.

2. Description of the Related Art

Due to the wide distribution of mobile devices such as mobile phones, personal digital assistants ("PDAs"), portable multimedia players ("PMPs"), and digital multimedia broadcasting ("DMB"), various types of flat panel display ("FPD") apparatuses such as liquid crystal displays ("LCDs"), plasma display panels ("PDPs"), and organic light emitting diodes ("OLEDs") are being developed.

Since display panels of LCDs do not emit light themselves, a backlight is often used in conjunction with the display panel. When the backlight is used it may be classified into a direct type or an edge-lit type according to the position of a light source included therein. In the edge-lit type of backlight, the light source is positioned at one side of a light guide plate ("LGP") and light is emitted from the light source and uniformly vertically distributed throughout the entire surface of a display. In a small display, a thickness of the display and an efficiency of the light source are important and thus a light emitting diode ("LED") may be used as the light source.

Such a light source may be applied not only to displays but also to lighting devices and may be used to obtain uniform surface emission using a point light source such as an LED. In addition, displays using reflection of external light, such as a reflective type LCD, often use light incident from a front thereof. A light source structure using a flexible light guide plate may be used as a backlight or a front light in realizing a flexible display and thus may be applied in various areas. Also, such a light source structure may be used as a direct light source and thus may be applied to various lighting devices.

In order to realize white light, LEDs emitting different spectrums, i.e. colors, of light, for example, red, green, and blue, may be simultaneously used or an individual white LED may be used. However, the mechanical structure of such a backlight may be complicated and thus a manufacturing cost thereof is a concern.

SUMMARY

One or more embodiments include a light guide plate capable of realizing white light and a display apparatus including the light guide plate.

Additional aspects will be set forth in part in the description which follows and, in part, will be apparent from the description, or may be learned by practice of the presented embodiments.

According to one or more embodiments, a light guide plate includes; a plurality of quantum dots dispersed on at least one of a surface of the light guide plate and inside the light guide plate, wherein the plurality of quantum dots emit light having a different wavelength than a light incident thereto.

In one embodiment, the plurality of quantum dots may include at least two different types of quantum dots, wherein each type of quantum dot has a different size than the other type of quantum dot.

In one embodiment, the light guide plate may be flexible.

In one embodiment, the light guide plate may further include an emission pattern disposed on at least one surface of the light guide plate.

In one embodiment, the plurality of quantum dots may be at least one of disposed inside of the emission pattern and on a surface of the emission pattern.

In one embodiment, the plurality of quantum dots may include at least one of group II-VI materials, group III-V materials, group IV materials and a combination thereof.

In one embodiment, the plurality of quantum dots may include at least one selected from the group consisting of CdSe, CdTe, CdS, ZnSe, ZnTe, ZnS, InP, GaP, GaInP2, PbS, ZnO, TiO2, AgI, AgBr, HgI2, PbSe, In2S3, In2Se3, Cd3P2, Cd3As2, GaAs and combinations thereof.

According to one or more embodiments, a display apparatus includes; a reflector; a light guide plate disposed having a first side thereof disposed substantially opposite to the reflector, a light source aligned with a second side of the light guide plate, at least one optical sheet disposed on the light guide plate, a display panel disposed on the at least one optical sheet; and a plurality of quantum dots dispersed on at least one of the surface of the light guide plate and inside of the light guide plate.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
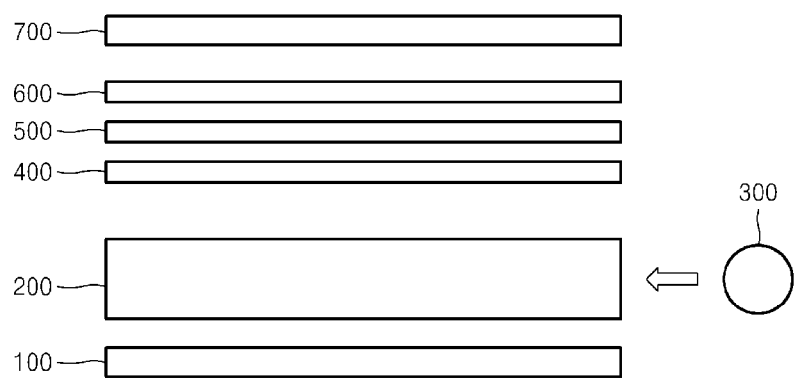
FIG. 1 is a cross-sectional diagram of an embodiment of a display apparatus.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

FIG. 1 is a cross-sectional diagram of an embodiment of a display apparatus.

Referring to FIG. 1, a reflector 100 is disposed on one surface of a light guide plate ("LGP") 200 and a light source 300 is disposed at one side of the LGP 200. In the embodiment illustrated in FIG. 1, the surface on which the reflector 100 is disposed is substantially perpendicular to the surface facing the light source 300. The LGP 200, the reflector 100, and the light source 300 form a light source unit. In one embodiment, the light source 300 may use a point source of light and may be a blue light emitting diode ("LED") or a ultra violet ("UV") LED. Embodiments include configurations wherein the light source 300 may be disposed at one side or two sides of the LGP 200, e.g., although not illustrated in FIG. 1, a second light source may be added on a side of the LGP 200 substantially opposite the side of the LGP to which the light source 300 is adjacent.

A diffuser sheet 400, a prism sheet 500, and a protection sheet 600 are optical sheets and are sequentially disposed on another surface of the LGP 200 substantially opposite to the surface the reflector 100 is disposed on and a liquid crystal display ("LCD") panel 700 is formed on the protection sheet 600. That is, the LGP 200, the optical sheets such as the diffuser sheet 400, the prism sheet 500, and the protection sheet 600, and the LCD panel 700 are sequentially disposed on the LGP 200 and the light source 300 is disposed at one side of the LGP 200. Embodiments include configurations wherein one or more of the optical sheets described above may be omitted, and configurations wherein additional optical sheets are included.

The diffuser sheet 400 uniformly diffuses light emitted from the LGP 200 onto the entire surface of the LCD panel 700. The prism sheet 500 may have an array of triangular prisms arranged on a surface thereof and may concentrate light emitted from the diffuser sheet 400 toward the LCD panel 700, e.g., it may planarize the diffused light coming from the diffuser sheet 400. Embodiments of the prism sheet 500 may be formed to have a double-layered structure. The LCD panel 700 may include a thin film transistor ("TFT") and receives light from the LGP 200, since the LCD panel 700 does not emit light by itself.

Embodiments of the LGP 200 may be formed of a single layer or a double-layer including at least one selected from the group consisting of polymethacrylate ("PMMA"), polycarbonate ("PC"), cycloolefin copolymer ("COC"), transparent polyolefin resin, transparent polystyrene resin, glass, silicon rubber, polydimethylsiloxane and other materials having similar characteristics. The LGP 200 may have a light transmission property and may be formed of a flexible material. The LGP 200 may include a plurality of quantum dots (not illustrated in FIG. 1, but discussed in more detail with respect to FIGS. 2-4) dispersed on a surface thereof or dispersed therein. Embodiments of the quantum dots may include group II-VI materials, group III-V materials, group IV materials, combinations thereof and other materials having similar characteristics and may include at least one selected from the group consisting of CdSe, CdTe, CdS, ZnSe, ZnTe, ZnS, InP, GaP, GaInP2, PbS, ZnO, TiO2, AgI, AgBr, HgI2, PbSe, In2S3, In2Se3, Cd3P2, Cd3As2, GaAs, combinations thereof and other materials having similar characteristics. Embodiments include configurations wherein the quantum dots may be dispersed in only one region of the LGP 200 or throughout the entire inside of the LGP 200. Also, embodiments include configurations wherein the quantum dots may be dispersed on a part of a surface of the LGP 200, for example, on one side of the LGP 200 or may be interposed between the LGP 200 and the reflector 100.

The quantum dots convert relatively short wavelength light, e.g., blue light or UV light, emitted from the light source 300, such as from a blue LED or a UV LED, into visible light, thereby emitting white light out of the LGP 200. When light is irradiated onto the quantum dots, the wavelength of emitted light varies according to the size of the quantum dots. For example, when the quantum dots include CdSe and UV is irradiated onto the quantum dots, the wavelength of emitted light is changed according to a size of the CdSe quantum dots. When the diameters of the CdSe quantum dots are about 1.7 nm, about 2.3 nm, and 5.0 nm, blue light, green light, and red light is emitted from the different sized quantum dots, respectively. Accordingly, when a UV LED is used as the light source 300 and the quantum dots having sizes that may emit blue, green, and red lights are included, white light may be emitted as a result of the combination of different wavelength light emitted by the differently sized quantum dots. In addition, when a blue LED is used as the light source 300 and the quantum dots having sizes that may emit green and red lights are included, and thereby white light may be emitted due to the combination of the red light and green light from the quantum dots and some blue light from the light source 300 which is not converted to green or red light. That is, at least two types, for example, two types or three types, of quantum dots each having a different size may be dispersed on the surface or inside of the LGP 200. A region for the quantum dots is not limited to a specific region of the LGP 200 and may be determined according to the specific requirements of the light source unit.

Since the quantum dots have high color purity, a display apparatus having the quantum dots may obtain a white light having improved light transmission properties. In addition, the size of the quantum dots may be adjusted to realize various color lights and thus a single light source may be used to easily obtain various color lights according to the sizes and types of quantum dots included therein.

Figure 2:
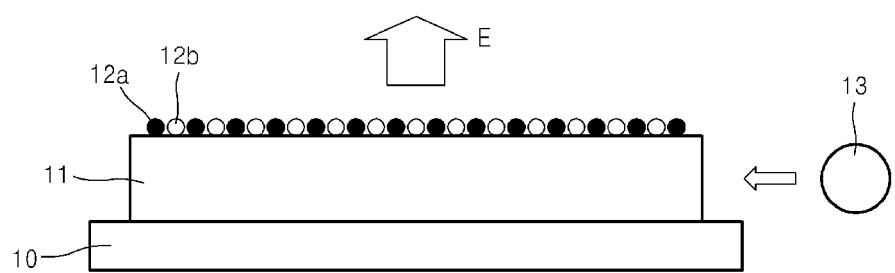
FIG. 2 is a cross-sectional diagram of an embodiment of a light guide plate ("LCD")

FIG. 2 is a cross-sectional diagram of an embodiment of an LGP 11. Referring to FIG. 2, the LGP 11 is formed on a reflector 10 and a light source 13 is disposed at one or more sides of the LGP 11. Quantum dots 12a and 12b are formed on the LGP 11. The quantum dots 12a and 12b may include group II-VI materials, group III-V materials, group IV materials, combinations thereof and other materials having similar characteristics and may include at least one selected from the group consisting of CdSe, CdTe, CdS, ZnSe, ZnTe, ZnS, InP, GaP, GaInP2, PbS, ZnO, TiO2, AgI, AgBr, HgI2, PbSe, In2S3, In2Se3, Cd3P2, Cd3As2, GaAs, combinations thereof and other materials having similar characteristics.

When a blue LED is used as the light source 13, two types of the quantum dots 12a and 12b may have corresponding sizes to emit green and red lights, respectively. In FIG. 2, the quantum dots 12a and 12b are formed on an emission (E) area of the LGP 11. However, alternative embodiments of the quantum dots 12a and 12b may be formed on other areas and may be formed inside of the LGP 11 and between the LGP 11 and the reflector 10. Also, the dispersion density of the quantum dots 12a and 12b disposed on one side of the LGP 11 adjacent to the light source 13 may be adjusted to be lower than the dispersion density of the quantum dots 12a and 12b disposed on an opposite side of the LGP 11 relatively far from the light source 13. When light is emitted from the LGP 11, the light contacts the quantum dots 12a and 12b and the wavelength of the light is changed according to the two types of the quantum dots 12a and 12b, which together with the blue light emitted by the light source 13 which is not converted by the quantum dots 12a and 12b, thereby combine to emit white light.

Figure 3:
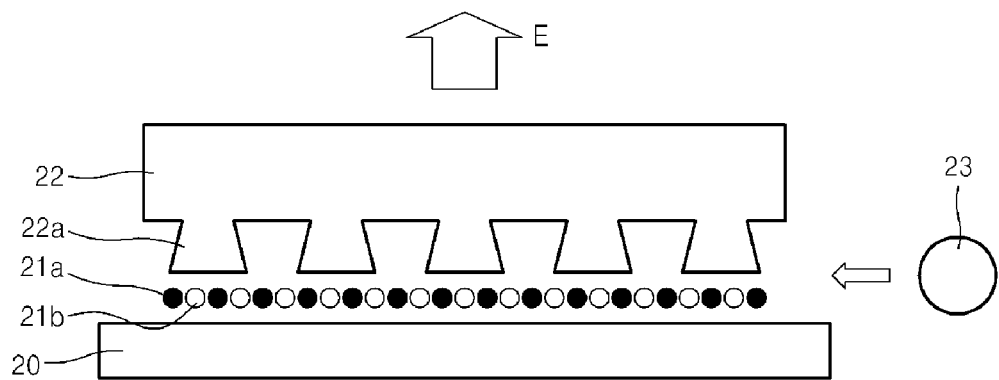
FIG. 3 is a cross-sectional diagram of an embodiment of an LGP having an emission pattern interposed between the LGP and a reflector.

Embodiments of an LGP may include an emission pattern formed on at least one surface thereof. FIG. 3 is a cross-sectional diagram of an embodiment of an LGP 22 having an emission pattern 22a interposed between the LGP 22 and a reflector 20.

Referring to FIG. 3, the LGP 22 having the emission pattern 22a thereon is disposed on the reflector 20 and a light source 23 is disposed at one or more sides of the LGP 22. Quantum dots 21a and 21b are interposed between the emission pattern 22a and the reflector 20. Optionally, alternative embodiments of the LGP 22 have configurations wherein the quantum dots 21a and 21b may be formed inside of the LGP 22, formed on the LGP 22 outside of the emission pattern 22a, or formed in the emission pattern 22a.

In one embodiment, the LGP 22 and the emission pattern 22a may be formed of the same material. Optionally, the LGP 22 and the emission pattern 22a may each be formed of different flexible materials. In one embodiment, the LGP 22 and the emission pattern 22a may be formed as a single, unitary and indivisible body wherein a physical and optical boundary between the LGP 22 and the emission pattern 22a does not exist. Total internal reflection for incident light may occur in the LGP 22 and the emission pattern 22a may direct incident light out of the LGP 22 in the direction indicated by the arrow labeled "E". Embodiments of the emission pattern 22a may be formed in various structures such as a trapezoid pattern, a reversed trapezoid pattern, a dot print pattern, a hologram pattern, a prism pattern, an inverse prism pattern or other similar patterns. A LGP 31 and an emission pattern 31a illustrated in FIG. 4 are the same as the LGP 22 and the emission pattern 22a, simply with the orientation of the emission pattern 22a reversed.

When light is emitted from the light source 23 disposed at one side of the LGP 22, light may not be emitted to an upper side of the LGP 22 due to total reflection and may be emitted through the emission pattern 22a on a lower part of the LGP 22. Light emitted through the emission pattern 22a contacts the quantum dots 21a and 21b and the wavelength of the light is changed according to the two types of the quantum dots 21a and 21b. Light in which the wavelength thereof is changed is reflected again by the reflector 20 or enters again into the LGP 22 through the emission pattern 22a, thereby being emitted onto an emission E area. When the quantum dots 21a and 21b are positioned in an optical path, the wavelength of light contacting the quantum dots 21 along that optical path is changed. Thus, when the quantum dots 21a and 21b are formed inside of the LGP 22 or on the LGP 22, white light may be emitted through a change in wavelength of the light emitted from the light source 23.

Figure 4:
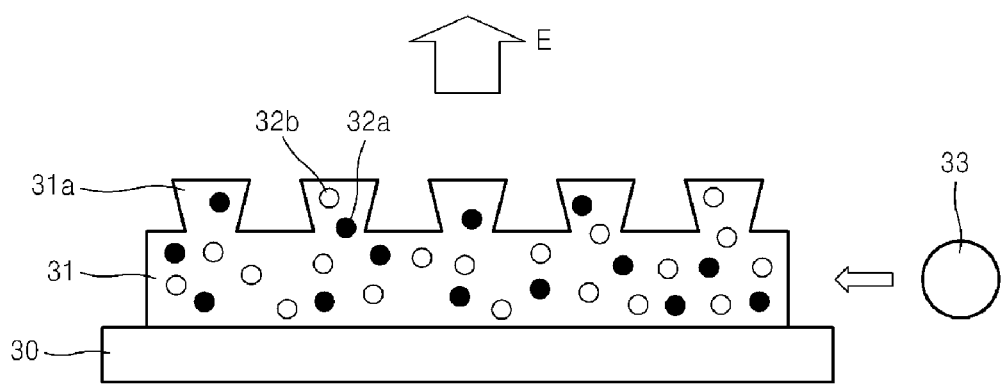
FIG. 4 is a cross-sectional diagram of an embodiment of an LGP having an emission pattern formed on an emission area.

FIG. 4 is a cross-sectional diagram of a LGP 31 having an emission pattern 31A formed on an emission E area.

Referring to FIG. 4, the LGP 31 having the emission pattern 31a thereon is disposed on a reflector 30 and a light source 33 is disposed at one or more sides of the LGP 31. Quantum dots 32a and 32b are formed inside of the LGP 31. Optionally, embodiments include configurations wherein the quantum dots 32a and 32b may be interposed between the LGP 31 and the reflector 30 or may be formed on the LGP 31. The LGP 31 may be flexible or non-flexible as described above.

When light is emitted from the light source 33 disposed at one side of the LGP 31, light is reflected by total reflection and by the reflector 30 formed on the lower part of the LGP 31 and is emitted through the emission pattern 31a on the LGP 31. Here, the wavelength of the light emitted by the light source 33 is changed by the quantum dots 32a and 32b in the LGP 31 and thus white light may be obtained by a combination of the light from the light source 33 and the wavelength-modified light emitted by the quantum dots 32a and 32b. The white light is emitted to the emission E area through the emission pattern 31A.

As described above, according to the one or more of the above embodiments, quantum dots may be dispersed inside of an LGP, between the LGP and a reflector, and on an emission surface of the LGP, in the LGP and the display apparatus including the LGP. Also, when an emission pattern is formed on the LGP, the quantum dots may be dispersed within the LGP or on a surface of the LGP regardless of the form and position of the emission pattern.

According to the one or more of the above embodiments, a point source of light having a single color is used to realize a surface light source having white light. Here, since a point source of light having a single color is used, the type and arrangement of the point source of light may be simplified compared with a backlight using a multi-color light source. Also, uniform light distribution may be accomplished due to partial density control of the quantum dots on or within the LGP.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A light guide plate comprising:
    a plurality of quantum dots dispersed on at least one of a surface of the light guide plate and inside the light guide plate,
    wherein the plurality of quantum dots comprise at least two different types of quantum dots, wherein each type of quantum dot has a different size than the other type of quantum dot, and
    wherein the plurality of quantum dots emit light having a different wavelength than a light incident thereto.

2. The light guide plate of claim 1, wherein the light guide plate is flexible.

3. The light guide plate of claim 1, further comprising an emission pattern disposed on at least one surface of the light guide plate.

4. The light guide plate of claim 3, wherein the plurality of quantum dots are at least one of disposed inside of the emission pattern and disposed on a surface of the emission pattern.

5. The light guide plate of claim 4, wherein the quantum dots comprise at least one of group II-VI materials, group III-V materials group IV materials and a combination thereof.

6. The light guide plate of claim 5, wherein the quantum dots comprise at least one selected from the group consisting of CdSe, CdTe, CdS, ZnSe, ZnTe, ZnS, InP, GaP, GaInP2, PbS, ZnO, TiO2, AgI, AgBr, HgI2, PbSe, In2S3, In2Se3, Cd3P2, Cd3As2, GaAs and combinations thereof.

7. A display apparatus comprising:
    a reflector;
    a light guide plate disposed having a first side thereof disposed substantially opposite to the reflector;
    a light source aligned with a second side of the light guide plate;
    at least one optical sheet disposed on the light guide plate;
    a display panel disposed on the at least one optical sheet; and
    a plurality of quantum dots dispersed on at least one of a surface of the light guide plate and inside of the light guide plate, wherein the plurality of quantum dots comprise at least two different types of quantum dots, wherein each type of quantum dot has a different size than the other type of quantum dots.

8. The apparatus of claim 7, wherein the light guide plate is flexible.

9. The apparatus of claim 7, further comprising an emission pattern disposed on at least one side of the light guide plate.

10. The apparatus of claim 9, wherein the quantum dots are at least one of disposed inside the emission pattern and disposed on a surface of the emission pattern.

11. The apparatus of claim 10, wherein the quantum dots comprise at least one of group II-VI materials, group III-V materials, group IV materials and a combination thereof.

12. The apparatus of claim 11, wherein the quantum dots comprise at least one selected from the group consisting of CdSe, CdTe, CdS, ZnSe, ZnTe, ZnS, InP, GaP, GaInP2, PbS, ZnO, TiO2, AgI, AgBr, HgI2, PbSe, In2S3, In2Se3, Cd3P2, Cd3As2, GaAs and combinations thereof.

13. The apparatus of claim 7, wherein the at least one optical sheet comprises at least one of a diffuser sheet, a prism sheet and a protection sheet.

14. The apparatus of claim 7, wherein the light source comprises at least one of a blue light emitting diode and an ultra violet light emitting diode.

15. The apparatus of claim 7, wherein the first side of the light guide plate is substantially perpendicular to the second side of the light guide plate.

16. The apparatus of claim 7, wherein the first side of the light guide plate is substantially parallel with the second side of the light guide plate.

* * * * *